United States Patent [11] 3,551,670

| [72] | Inventors | George J. Topol<br>Reston;<br>Larry R. Carr, Vienna, Va. |
|---|---|---|
| [21] | Appl. No. | 742,447 |
| [22] | Filed | July 3, 1968 |
| [45] | Patented | Dec. 29, 1970 |
| [73] | Assignee | Bowser, Inc.<br>a corporation of Indiana |

[54] SLUDGE LEVEL DETECTOR USING AN INFRARED SOURCE AND DETECTOR
12 Claims, 6 Drawing Figs.

[52] U.S. Cl. .................................................. 250/43.5,
 250/83.3, 356/208
[51] Int. Cl. ..................................................... G01n 21/26,
 G01n 23/12
[50] Field of Search ........................................... 250/43.5,
 43.5D, 43.5FL, 83.3IR; 356/208

[56] References Cited
UNITED STATES PATENTS
| 2,580,500 | 1/1952 | Albert ........................... | 356/208 |
| 3,319,514 | 5/1967 | McAllister, Jr. ................ | 356/208 |

FOREIGN PATENTS
| 1,421,188 | 11/1965 | France ......................... | 356/208 |

Primary Examiner—William F. Lindquist
Attorney—Jeffers & Rickert

ABSTRACT: The level of sludge in a liquid is determined by a detector mounted on an elongated, vertical, cylindrical support. The detector includes a source of infrared light which does not promote the growth of algae and other life, and an infrared detector which is protected from sunlight by the liquid. The detector is mounted on the support in a smooth structure to prevent accumulation of sludge and sediment.

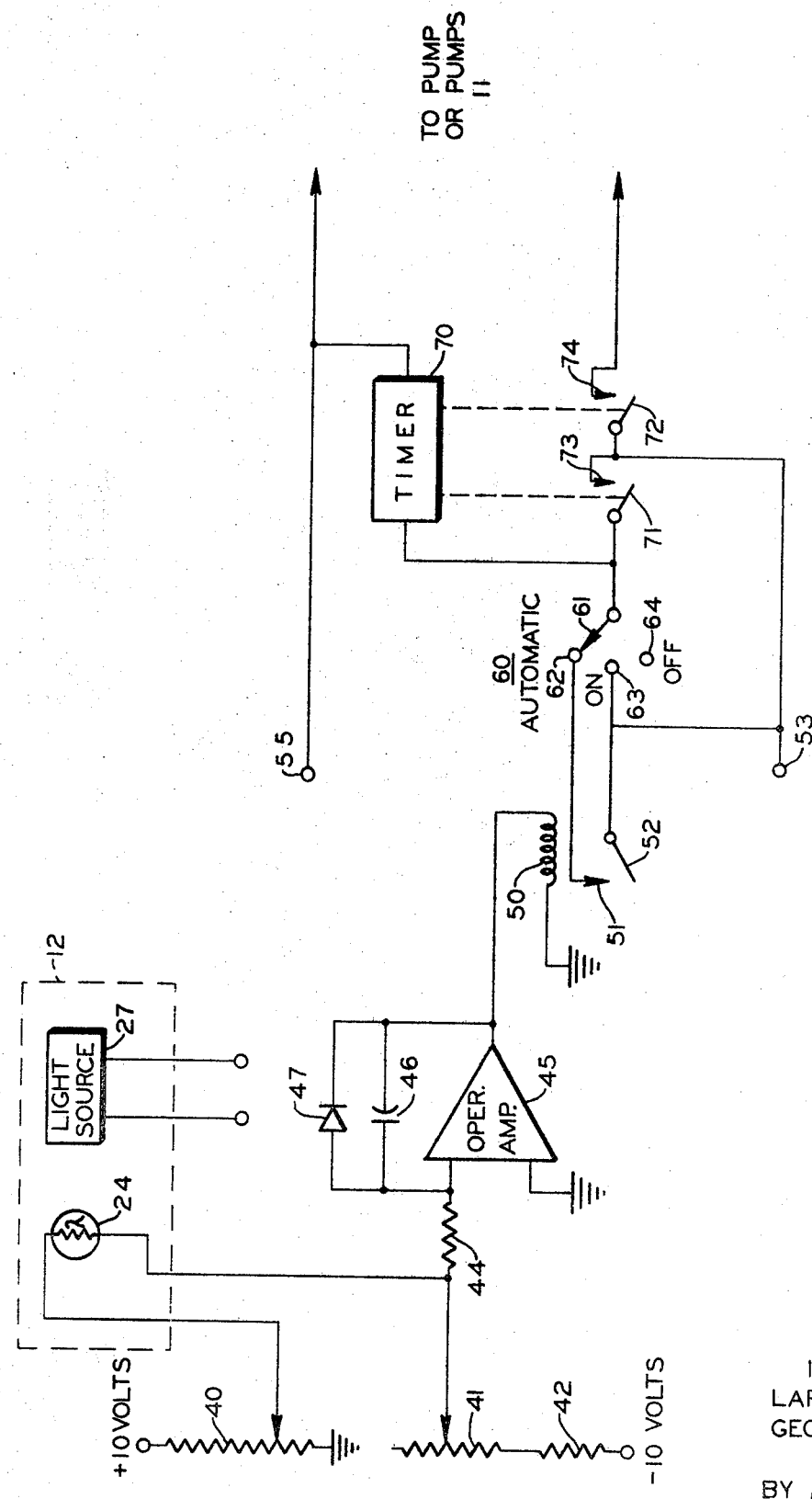

SLUDGE LEVEL DETECTOR USING AN INFRARED SOURCE AND DETECTOR

BACKGROUND OF THE INVENTION

Our invention relates to a sludge level detector, and particularly to an improved sludge level detector that is designed to promote the growth of algae and other life as little as possible, and that is constructed to catch or retain as little sludge and other sediment as possible.

In a typical, modern sewage plant, incoming sewage is treated so as to separate the sewage into clear water or liquid and into sludge. The water is discharged into a receiving stream, and the sludge is disposed of by any suitable means, such as being buried, burned, or used as fertilizer. In the treatment, the incoming sewage is supplied to settling tanks where the sediment settles to the bottom of the tank to form the sludge. This sludge includes solid but light particles which settle to the bottom of the tank at a relatively slow rate, so that the level or thickness of the sludge at the bottom of the tank builds up slowly. If the tank is used long enough without removal of the sludge, the tank would eventually fill up and the sludge would become septic, a condition which would upset the process of treating the sewage. Hence, the sludge should be removed to provide good sewage treatment. However, if the sludge is removed too frequently or at a rapid rate, some of the clear water is also removed with the sludge. This dilutes the sludge and requires further treatment of the sludge before it is disposed. Therefore, the lower layer of the sludge should be removed at periodic intervals to prevent the accumulation of too much sludge and to prevent the removal of too much water or liquid with the sludge.

In some sewage plants, removal of the sludge is done on the basis of the experience of an operator, who may be able to make some estimate of the level of the sludge either by past experience or by use of a detector unit. One such detector unit is described and shown in U.S. Pat. No. 3,319,514 entitled SUBMERSIBLE TURBIDITY DETECTOR UNIT, and granted to D. G. McAllister, Jr., on May 16, 1967. The detector unit shown in that patent utilizes a visible light source and a photoelectric cell. Such a detector unit has several disadvantages. In the settling tank, the settled sludge is a thick, sluggish material which is very active biologically. When this material is exposed to visible light, a growth of algae or other life soon forms on the area illuminated by the light, either in the sludge or on any surface in contact with the sludge. This growth can render the detector useless unless it is cleaned frequently. It is possible to eliminate this growth by agitating the liquid and the sludge. However, this agitation disturbs the settling process, so that a well-defined, relatively solid mass of sludge cannot be formed. In addition, the particles in the sludge tend to adhere to each other in flocs, and readily adhere to or settle on the detector, particularly if the detector has rough surfaces or relatively large horizontal surfaces. Also in addition, the detector has been made relatively small in order to provide as little area as possible for particles to adhere to or settle on. Such a small size has resulted in the light source and photoelectric cell being closely spaced, and this close spacing requires a large quantity of sediment or sludge before an indication is provided.

Accordingly, a primary object of our invention is to provide an improved sludge level detector for use in sewage settling tanks or basins.

Another object of our invention is to provide a new and improved sludge level detector that prevents, or at least does not enhance, the growth of algae and other matter in the sludge and on the detector.

Another object of our invention is to provide an improved sludge level detector that is shaped and constructed so that sludge particles have very little or no tendency to adhere or settle on the detector.

Another object of our invention is to provide a new and improved sludge level detector that uses infrared light in its operation, but which is not adversely affected by sunlight because of the liquid above the detector.

Another object of our invention is to provide a new and improved sludge level detector having an infrared light source and light sensitive device spaced so that relatively clear liquid absorbs very little infrared light, but so that a relatively small amount of sediment or sludge will absorb sufficient light to provide a usable indication by the light sensitive device.

SUMMARY OF THE INVENTION

Briefly, these and other objects are achieved in accordance with our invention by a detector which is mounted on an elongated, cylindrical support that is to extend vertically downward into a settling tank. A first vertical cylinder extends downward from the support, and a horizontal cylinder extends from the first vertical cylinder. A second vertical cylinder extends downward from the horizontal cylinder so that two vertical cylinders are spaced and parallel. Transparent cylinders are respectively mounted at the bottom of the vertical cylinders. A light source that emits light in the infrared portion of the light spectrum is mounted in one transparent cylinder, and a light sensitive device is mounted in the other transparent cylinder in horizontal and operative relation. We have found that infrared light does not promote growth of algae and other life. But the infrared light does provide sufficient energy that is detected by the light sensitive device in clear liquid, but that is sufficiently blocked by small amounts of sludge so that the light sensitive device provides a usable indication. The detector has a minimum of horizontal surfaces and is cylindrically shaped and smooth so as to prohibit or prevent accumulation of particles on the detector. The detector is not affected by infrared light from the sun, since most of this light is absorbed by the liquid above the sludge.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

FIG. 6 shows an electrical circuit diagram of a control circuit which can be used with out sludge level detector.

DESCRIPTION OF THE PREFERRED EMBODIMENT

Figure 1:
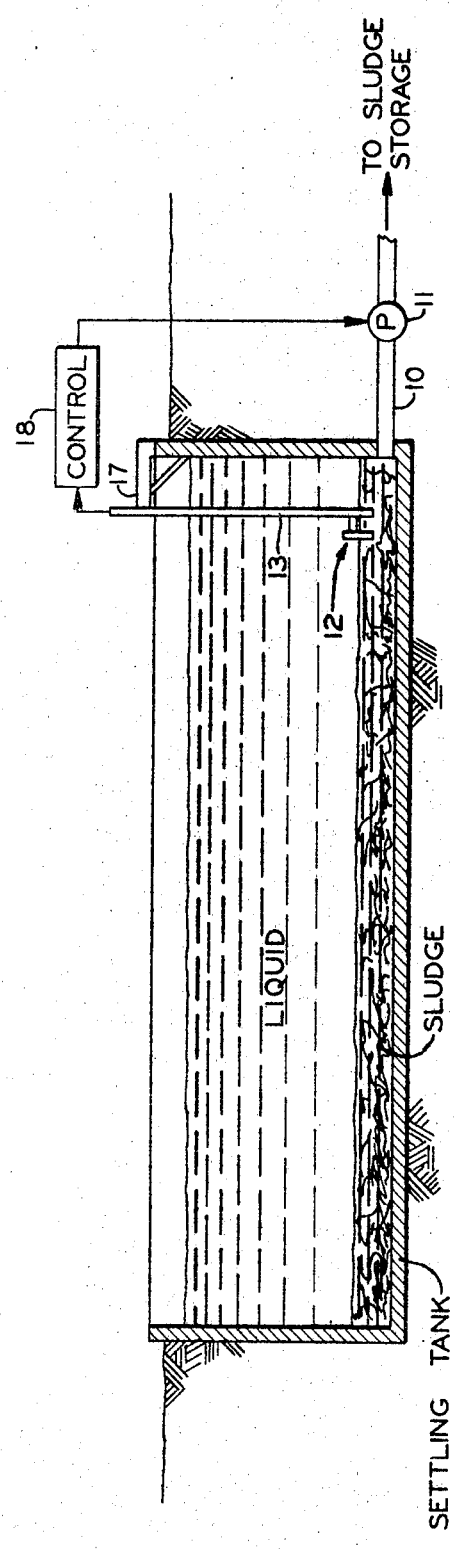
FIG. 1 shows an elevational view of a settling tank with our sludge level detector and a control circuit.

In FIG. 1, we have shown a sewage treatment settling basin or tank that utilizes our improved sludge level detector. The settling tank is supplied with sewage through some means which are not shown. The sediment in the sewage slowly falls to the bottom of the settling tank to form a sludge of relative dense particles of solid matter at the bottom, and to leave a relatively clear liquid or water in the upper part of the settling tank. As the sludge accumulates, its upper level rises. It is desirable to remove some of the sludge so that the sludge in the tank does not become septic. A septic condition is not usually desirable in a sewage treatment plant. The sludge may be removed by one or more outlet pipes 10 which are connected to a pump 11 that pumps the sludge to a suitable location or storage tank where it is treated as indicated previously. A settling tank such as shown in FIG. 1 may be a relatively large structure having a depth from 8 to 30 feet and a diameter or horizontal dimension from 20 to 200 feet, for example. However, our invention is not limited to any specific tank. Because of the relatively large size of the settling tank and because of the fact that the sludge accumulates at the bottom of the settling tank, it is difficult for an operator to visually determine the depth of the sludge. Accordingly, some means or detector is provided to indicate the sludge level or depth. A sludge level detector 12 in accordance with our invention is positioned in the settling tank at the level or height at which the sludge level is to be maintained. Our sludge level detector 12 is suitably mounted on an elongated, cylindrical support 13 that extends vertically downward into the settling tank. The support 13 may be suitably and rigidly positioned by means of a bracket or platform 17 at one side or other convenient location on the tank. Electrical leads from our detector 12 are brought out through the support 13 to a control 18 which, as will be explained, operates the pump 11 whenever the level of the sludge reaches the level or height determined by the location of the detector 12. The pump 11 is activated by the control 18 for either a preset period of time; or until the sludge level falls below the detector 12. The pump 11 may also be operated by a manual switch. When the sludge level falls below the detector 12, the pump 11 is stopped.

Figure 2:
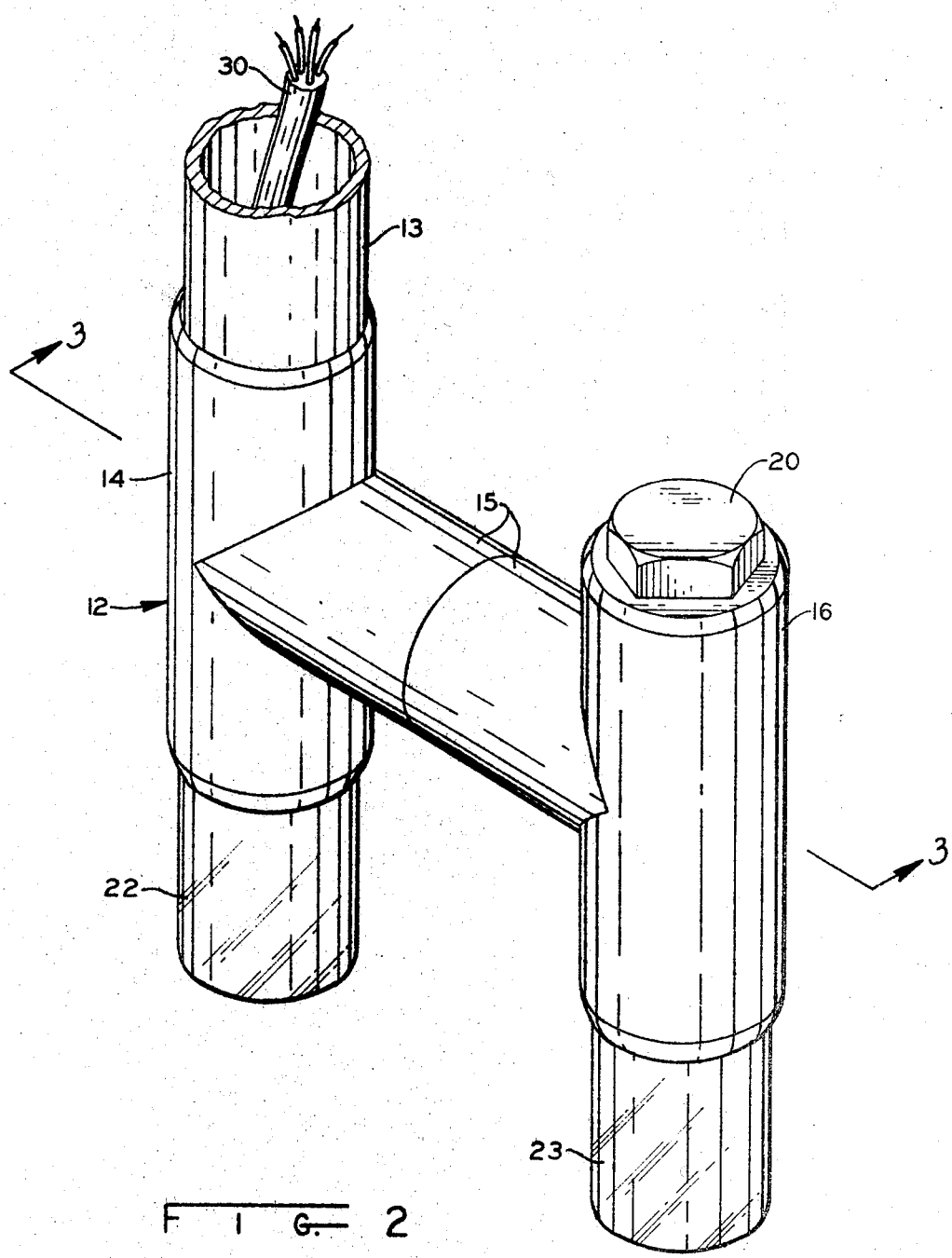
FIG. 2 shows a perspective view of our improved sludge level detector.
Figure 3:
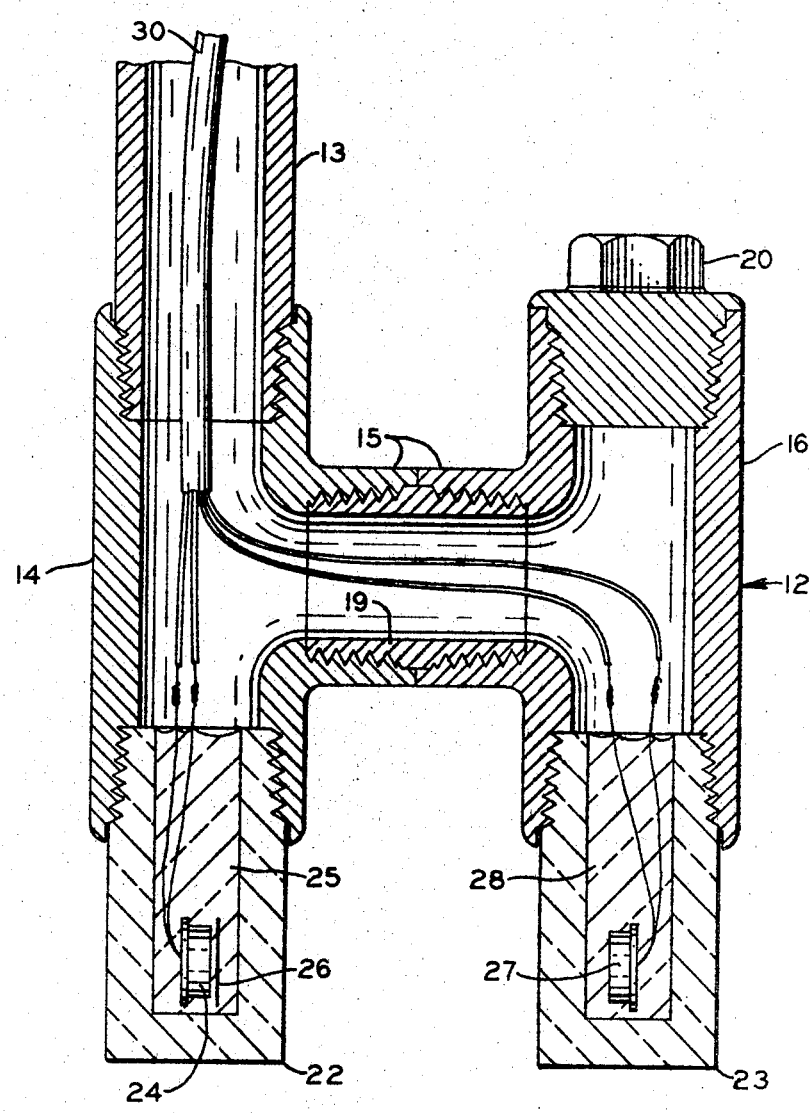
FIG. 3 shows a cross-sectional view taken along the line 3-3 in l FIG. 2.

FIGS. 2 and 3 show detailed views of the construction and arrangement of our improved detector 12 mounted at the bottom or lower end of the cylindrical support 13. The detector 12 includes a first or main cylinder or member 14 which is attached to and extends vertically downward from the support 13; a horizontal cylinder 15 which is attached to and extends horizontally from an intermediate part of the main cylinder 14 at right angles thereto; and a second or auxiliary cylinder or member 16 which is attached to the horizontal cylinder 15 and extends at right angles thereto in a vertical direction parallel to the main cylinder 14. Thus, the main and auxiliary cylinders or members 14, 16 are in spaced parallel relation. As shown in FIG. 2, the cylinders 14, 15, 16 have relatively smooth exterior surfaces which tend to prevent, or at least do not promote, accumulation of sediment and particles thereon. As shown in FIG. 3, the cylinders 14, 15, 16 are actually formed of two plumbing tees which are joined at their horizontal junction by a plumbing nipple 19. The auxiliary cylinder 16 is closed at its upper end by a suitable threaded plug or cap 20. We prefer that the hexagonal structure of the cap 20 be smoothed or rounded off to prevent as much accumulation of particles or sediment as possible. A cylinder 22 of light transparent material is attached by threads to the lower end of the main cylinder 14, and a similar cylinder 23 of light transparent material is attached by threads to the lower end of the auxiliary cylinder 16. The transparent cylinders 22, 23 may be made of any suitable material, such as clear acrylic plastic or other comparable plastic which passes infrared light. A light sensitive device 24 is held or mounted in the transparent cylinder 22 by a suitable transparent potting material 25. Also, a filter 26 is preferably positioned in the transparent cylinder 22 so that the sensitive surface of the light sensitive device 24 receives filtered light. The filter 26 preferably passes only infrared light, or at least cuts off wave lengths of light that are shorter than the red portion of the visible spectrum. An electric lamp or light source 27 is held or mounted in the transparent cylinder 23 by a suitable transparent potting compound 28. We prefer that the light source 27 supply only infrared light, or at least light wave lengths longer than the wave lengths of red light in the visible spectrum. As shown in FIG. 3, the light sensitive device 24 and the light source 27 are preferably positioned at the same horizontal level and are positioned in a facing and operative relation so that light from the source 27 is directed toward the light sensitive device 24, and so that the light sensitive device 24 has its most sensitive light receiving area facing the source 27. The light sensitive device 24 is preferably of the photoresistive type whose impedance varies inversely as a function of the amount of light energy received. The filter 26 preferably passed only light energy in the infrared region of the light spectrum or at least did not pass light energy having wave lengths shorter than 7,000 Angstroms. The light source 27 may be any suitable source of infrared light, and preferably is a solid state light emitting diode such as model number 483 sold by Electro-Nuclear Laboratories, Inc. Electrical leads from the light sensitive device 24 and from the light source 27 are brought out through the potting 25, and are placed in a cable 30 which extends through the support 13 upwardly to the control 18 shown in FIG. 1.

As also shown in FIG. 3, our detector 12 is preferably assembled by threaded connections so that it can be easily assembled, and so that it can be dismantled if any parts need service or replacement. However, the detector 12 may be formed of a single, integral piece fastened to or integral with the vertical support 13, as long as the outer or exterior surface of the detector 12 has a liquid tight, round, smooth configuration that prevents accumulation or deposit of sediment or particles. We have found that the use of infrared light, that is light having wave lengths longer that the red portion of the visible spectrum or longer than 7,000 Angstroms, does not promote or cause growth of algae and similar life as does light in the visible portion of the light spectrum. Further, we have found that the depth of the water or liquid in a settling tank such as shown in FIG. 1 tends to absorb substantially all of the infrared light emitted or supplied by the sun, so that our detector is not likely to provide erroneous or incorrect indications. But, since the light sensitive device 24 is relatively close to the light source 27, sufficient infrared energy passes through the water or liquid and reaches the light sensitive device 24 to provide a usable indication.

Figure 4:
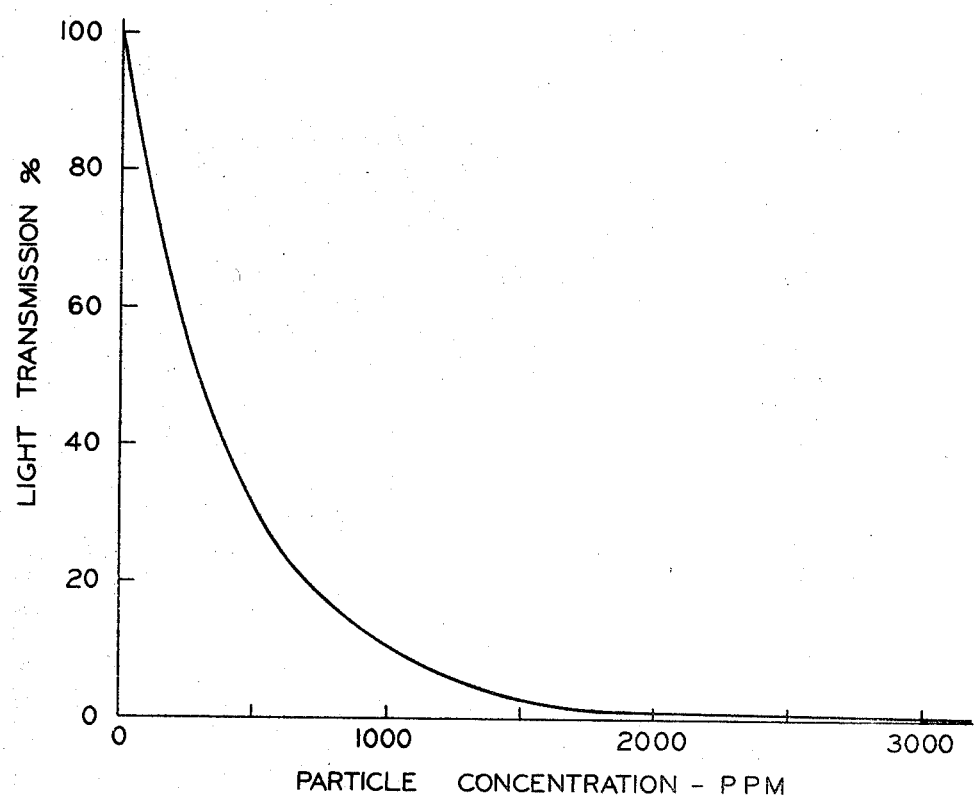
FIGS. 4 and 5 show graphs illustrating the operation of our sludge level detector of FIGS. 2 and 3.
Figure 5:
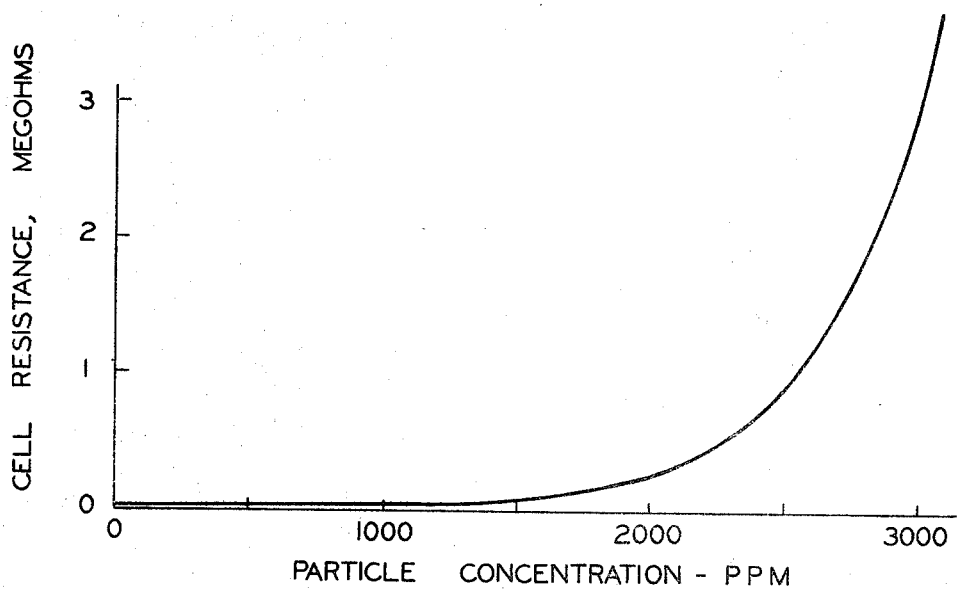

FIGS. 4 and 5 show the percent of relative light transmitted and the resistance of a light sensitive device as a function of particle concentration for a detector such as shown in FIGS. 2 and 3. These characteristics are for a detector having a light source that emits light of a wave length around 9,000 Angstroms, and with the light sensitive device 24 and the light source 27 separated by a spacing of 1.75 inches. In FIG. 4, the percent of transmitted light decreases exponentially as the particle concentration in parts per million (ppm) increases. Similarly, the resistance of the light sensitive device increases exponentially as the particle concentration increases. With a particle concentration of 2,000 parts per million, only 1 percent or less of the light is transmitted, and the resistance of the light sensitive device is approximately 0.3 megohm. If the particle concentration increases to 2,300 parts per million (an increase of only 15 percent from 2,000 per parts per million), the resistance of the light sensitive device increases to almost 0.6 megohm (an increase of almost 100 percent). This is sufficient to provide a usable indication under fairly adverse conditions. As the particle concentration increases further, the resistance of the light sensitive device rises even more sharply. The change in resistance can be used in a circuit to indicate that the sludge level has reached the detector 12, and that the sludge should be removed or pumped out of the settling tank. Improper or erroneous operation of our detector is substantially eliminated by the use of the infrared light source and the infrared light sensitive device, since infrared light from the sun is substantially blocked by the liquid in the settling tank. And, growth of algae and other life is almost completely prevented. Algae and similar life do not grow in the presence of infrared light as they do in visible light which was previously used in such detectors. And, the accumulation of sediment and other particles is prevented, particularly on and around the transparent cylinder 22, 23 because of the smooth exterior construction of the detector 12, especially the vertical portions.

FIG. 6 shows a schematic diagram of a circuit which can be used as the control 18 shown in FIG. 1. The light sensitive device 24 is represented schematically as a resistor and the symbol lambda, and the light source 27 is indicated by a block. These two elements are enclosed by dashed lines marked by the reference numeral 12 to indicate the detector 12 in FIGS. 1, 2, and 3. The light source 27 is connected to a suitable voltage source that is not shown. The light sensitive device 24 is connected to the movable contact of a first potentiometer or variable resistor 40, and to the movable contact and of a second potentiometer or variable resistor 41. The variable resistor 40 is connected between a positive voltage source, such as plus 10 volts, and ground; and the variable resistor 41 is connected to a negative voltage source, such as minus 10 volts. The movable contact of the variable resistor 41 is connected through a time delay resistor 44 to the input of an operational amplifier 45. Feedback from the operational amplifier 45 is coupled back to the input through a time delay capacitor 46 and a diode 47. The output of the operational amplifier 45 is coupled to a control relay winding 50 having a set of associated normally open contacts 51, 52. The circuit as described thus far is arranged, depending upon the setting of the movable contacts on the resistors 40, 41, so that when the resistance of the light sensitive device 24 increases sufficiently (indicating reduced light received because of more sludge or particles), the operational amplifier 45 produces an output that causes energization of the relay winding 50. When the relay winding 50 is energized, its associated contacts 51, 52 are closed.

A function switch 60 is provided. This switch 60 has a movable arm 61 that engages one of three contacts: an automatic contact 62, or an on contact 63, or an off contact 64. The automatic contact 62 is connected to the relay contact 51; the on contact 63 is connected to the relay contact 52 and to one side of a suitable power supply at the terminal 53; and the off contact 64 is left unconnected. The movable arm 61 is connected to one terminal of a timer 70. The other terminal of the timer 70 is connected to the other side of the power supply at the terminal 55. The timer 70 is a reset type of timer which, when energized, causes two movable contacts 71, 72 to engage their respective fixed contacts 73, 74. The movable contact 71 is connected to the movable switch arm 61. The fixed contact 73 is connected to the power supply terminal 53 and to the movable contact 72. The fixed contact 74 is connected to a pump 11 which is connected directly to the other power supply terminal 55. There may be a plurality of pumps, but only one such pump is mentioned in order to simplify the description. The timer 70 is a commercially available timer such as the HP5 series manufactured by the E. W. Bliss Company of Davenport, Iowa. When the timer 70 is energized, it begins a timing cycle having a timing duration or period that can be preset to any desired length of time. During the timing period, the contacts 71, 73 and the contacts 72, 74 are closed. If, after the timing period ends, the timer 70 is still energized, the contacts 71, 73 open but the contacts 72, 74 remain closed. The contacts 72, 74 open after the timer 70 is deenergized. Or, if, after the timing period ends, the timer 70 is deenergized, then both contacts 71, 73 and the contacts 72, 74 open. The circuit with the timer 70 is provided in order to reduce intermittent or short-time operation of the pump 11, since such intermittent or short-time operation causes undue wear and damage to contacts and moving parts.

The operation of the circuit of FIG. 6 will be explained. First, assume that the movable arm 61 of the function switch 60 is set on the automatic contact 62. When the sludge level in the settling tank shown in FIG. 1 reaches the detector 12, the light sensitive device 24 begins to present increased resistance, and eventually will cause the operational amplifier 45 to produce a voltage that energizes the relay winding 50. This causes the contacts 51, 52 to close so that the timer 70 is connected to the power supply terminal 53 as well as the power supply terminal 55. This energizes the timer 70 so that the contacts 72, 74 close (the contacts 71, 73 also close) and connect the power supply terminal 53 to the pump 11. This causes the pump 11 to operate. The pump 11 will operate for at least the length of time set by the timer 70. As the pump 11 operates, the sludge level is reduced so that the light sensitive device 24 decreases in resistance and eventually the relay 50 becomes deenergized. If the timing period preset in the timer 70 has not expired, the closed contacts 72, 74 keep the pump 11 energized until the preset timing period expires. Upon expiration of the timing period, the contacts 72, 74 open and the pump 11 will be turned off. However, if the sludge level is still above the light sensitive device 24 after the timing period expires, the relay contacts 51, 52 remain closed so that the timer 70 remains energized. Thus, the contacts 72, 74 are kept closed and the pump 11 remains on. When the sludge level falls below the light sensitive device 24, the relay contacts 51, 52 will open and deenergize the timer 70, and the contacts 72, 74 will open to turn off the pump 11. This is the automatic operation, and serves to save wear and damage to the pump 11 and other moving parts.

Second, assume that the manual operation is desired. For the manual operation, the movable arm 61 of the function switch 60 is set on the on contact 63. This energizes the timer 70 so that the contacts 71, 73 and the contacts 72, 74 close. Power is thus supplied to the pump 11 through the contacts 72, 74. The pump 11 will remain energized as long as the movable arm 61 is connected to the on contact 63, and at least for the preset time duration of the timer 70. When it is desired to manually turn the pump 11 off, the movable arm 61 is moved to the off contact 64 to deenergize the timer 70. If the preset timing period has expired, the pump 11 will be turned off immediately. Or, if the preset timing period has not expired, the pump 11 will be turned off as soon as that timing period expires.

It will thus be seen that our detector provides an improved structure and operation. This improved smooth structure results in reduced accumulation of sediment and particles. The use of the infrared light discourages or prevents algae growth. And because of the liquid above the detector, the detector is not subject to interference or erroneous operation by outside sunlight. While we have shown only one embodiment of our invention, persons skilled in the art will appreciate that modifications may be made. As already mentioned, the detector construction may either be assembled from threaded plumbing components or may be a single integral piece. The locations of the light source and the light sensitive devices may be interchanged. Various types of light sensitive devices, such as the photovoltaic or photoemissive type, may be used instead of the variable resistance device described. Likewise, other infrared light sources may also be used as long as light of wave lengths less than 7,000 Angstroms is not emitted. Therefore, while our invention has been described with reference to a particular embodiment, it is to be understood that modifications may be made without departing from the spirit of the invention or from the scope of the claims.

We claim:

1. An improved device for submergence in a liquid to detect the level of settled sludge in said liquid, said device comprising:
   a. a support for extending into said liquid;
   b. a first housing member mounted on said support, said first housing member containing a light source therein that emits light having wave lengths that are in the infrared portion of the light spectrum and that are greater than 7,000 Angstroms;
   c. a second housing member mounted on said support and spaced from said first housing member to admit liquid and sludge between said first and second housing members, said second housing member containing a light sensitive device therein;
   d. each of said first and second housing members having a transparent portion that passes said infrared light, said first housing member being arranged so that light from said light source passes through said transparent portion toward said light sensitive device in said second housing member, and said second housing member being arranged so that said light sensitive device receives light through said transparent portion from said light source in said first housing member; and
   e. and electrical leads connected to said light source and to said light sensitive device for connection to an electrical circuit.

2. The improved device of claim 1, and further comprising a filter mounted in said second housing member in front of said light sensitive device, said filter passing light having wave lengths that are in the infrared portion of the light spectrum and that are greater than 7,000 Angstroms.

3. The improved device of claim 1 wherein each of said housing members comprises a transparent cylinder that is formed of plastic and that is threadedly fastened to said support, and wherein said light sensitive device and said light source are potted in a light transparent material in said transparent cylinders.

4. The improved device of claim 3, and further comprising a filter mounted in said second housing member in front of said light sensitive device, said filter passing light having wave lengths that are in the infrared portion of the light spectrum and that are greater than 7,000 Angstroms.

5. The improved device of claim 1, and further comprising an electrical circuit coupled to said light sensitive device leads, said electrical circuit having a timing circuit responsive to a change in the characteristic of said light sensitive device that indicates reduced light received thereby for producing an electrical signal for a time that has a predetermined duration.

6. An improved device for submergence in a liquid stored in a tank or other container to detect the level of settled sludge in said tank, said device comprising:
 a. an elongated support for extending vertically downward into said tank, said support being adapted to be mounted at its upper end;
 b. a main cylinder attached to the lower end of said support and extending vertically downward from said lower end;
 c. a horizontal cylinder attached to an intermediate part of said main cylinder and extending horizontally therefrom at right angles thereto;
 d. an auxiliary cylinder attached to the outer end of said horizontal cylinder and extending vertically downward therefrom at right angles thereto and parallel to said main cylinder;
 e. one transparent cylinder containing a light sensitive device mounted on the lower end of one of said main cylinder and said auxiliary cylinder;
 f. another transparent cylinder containing a light source mounted on the lower end of the other of said main cylinder and said auxiliary cylinder, said light source emitting light having wave lengths that are in the infrared portion of the light spectrum and that are greater than 7,000 Angstroms;
 g. said transparent cylinders being at substantially the same horizontal level and said light sensitive device and said light source facing each other in an operative relation;
 h. electrical leads connected to said light sensitive device and said light source and extending through said cylinders and said support for connection to an external electrical circuit; and
 i. said cylinders and said support having substantially the same diameter and having a smooth external surface that is closed and liquid tight.

7. The improved device of claim 6 wherein said main cylinder, said auxiliary cylinder, and said horizontal cylinder are formed of two plumbing tees joined at their center portion by a nipple.

8. The improved device of claim 6 wherein said transparent cylinders are substantially similar.

9. The improved device of claim 6, and further comprising a filter mounted in said one transparent cylinder in front of said light sensitive device, said filter passing light having wave lengths that are in the infrared portion of the light spectrum and that are greater than 7,000 Angstroms.

10. The improved device of claim 6 wherein said transparent cylinders are formed of plastic and are threadedly fastened to their respective ones of said main cylinder and said auxiliary cylinder, and wherein said light sensitive device and said light source are potted in a light transparent material in said transparent cylinders.

11. The improved device of claim 10, and further comprising a filter mounted in said one transparent cylinder in front of said light sensitive device, said filter passing light having wave lengths that are in the infrared portion of the light spectrum and that are greater than 7,000 Angstroms.

12. The improved device of claim 6, and further comprising an electrical circuit coupled to said light sensitive device leads, said electrical circuit having a timing circuit responsive to a change in the characteristic of said light sensitive device that indicates reduced light received thereby for producing an electrical signal for a time that has a predetermined duration.